Inventor
KURT SCHRÖTER

By Toulmin & Toulmin
Attorneys

Nov. 9, 1965 K. SCHRÖTER 3,216,543
FRICTION CLUTCH
Filed May 14, 1962 4 Sheets-Sheet 2
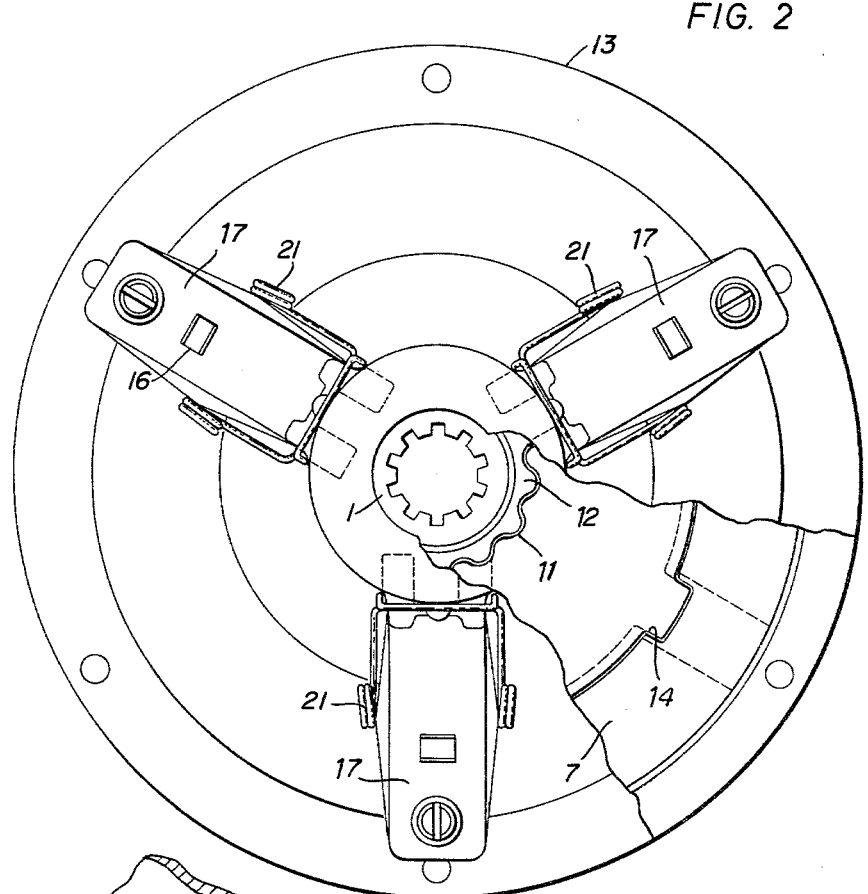
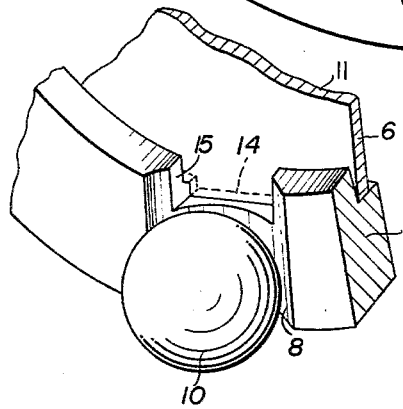
Inventor
KURT SCHRÖTER
By Toulmin & Toulmin
Attorneys

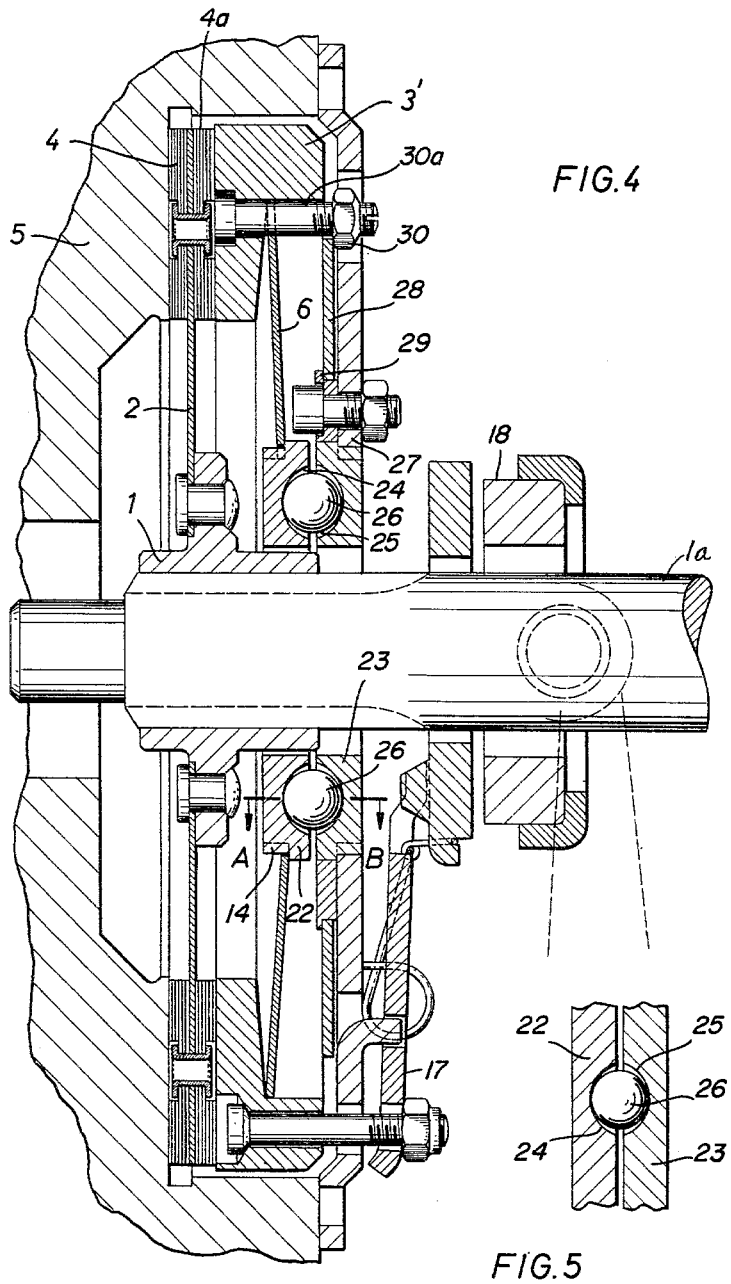

Nov. 9, 1965    K. SCHRÖTER    3,216,543
FRICTION CLUTCH

Filed May 14, 1962    4 Sheets-Sheet 4

Inventor
KURT SCHRÖTER
By Toulmin & Toulmin
Attorneys

United States Patent Office 3,216,543
Patented Nov. 9, 1965

3,216,543
FRICTION CLUTCH
Kurt Schröter, Lohmar, near Siegburg, Germany, assignor to Jean Walterscheid Kommanditgesellschaft, Lohmar, Rhineland, Germany
Filed May 14, 1962, Ser. No. 194,413
Claims priority, application Germany, June 12, 1961, W 30,150; Sept. 29, 1961, W 30,759
5 Claims. (Cl. 192—32)

The present invention relates to a friction clutch such as utilized in motor vehicles, more particularly, to an improvement in an overload friction clutch wherein the transmitted torque remains constant regardless of variations in the coefficient of friction or wear in the clutch linings.

Conventional friction clutches which are used for transmitting power have the disadvantage in that it is difficult to maintain constant the torque at which the clutch starts to slip. When a constant force is being exerted to press the clutch members into engagement, this torque will depend on the coefficient of friction of the engaging clutching surfaces.

In addition, experience has shown that different operating conditions of the clutch will also produce variations in the coefficient of friction. Examples of such conditions would include oil or water on the clutch linings and changes in temperature.

In an automatic transmission, wherein gears are shifted in response to the torque being delivered, it is preferable that the torques transmitted by the clutch are not wholly dependent on the friction values between the clutch linings. Such a clutch is also preferable under conventional operating conditions wherein gears are shifted manually since in such an application the driving components may be constructed of a smaller size since they will not be overstressed due to the transmission of greater torques resulting from fluctuations in the coefficients of friction of the clutch linings.

In friction clutches wherein the clutching surfaces are spring-loaded, this problem has been minimized by varying the forces of the springs as a function of the transmitted torque. Such clutches, however, have not been satisfactory in operation since these proposed structures can compensate only for relatively small fluctuations in the friction values between the clutching surfaces unless the dimensions of the springs used are uneconomically large. These clutches have the further disadvantage that the spring force urging the clutch members into engagement decreases when the surfaces of the clutch linings become worn. As a result, the torque which is transmitted decreases as the clutch linings continue to wear.

It is therefore the principal object of the present invention to provide a novel and improved friction clutch.

It is a further object of the present invention to provide an overload friction clutch having simplified and effective means for maintaining the torque transmitted by the clutch constant regardless of the wear of the clutch linings or variations in the coefficient of friction therebetween.

The friction clutch of the present invention essentially comprises a clutch casing and a clutch disc with there being cooperating clutch linings on these two members. An axially displaceable clutch member urges the clutch disc and clutch casing into frictional engagement. A conical disc spring urges against an actuating member which is drivingly connected to the coupling member by balls positioned in cooperating pairs of recesses having sloping walls in adjacent faces of the clutching member and the actuating member. The disc spring is constructed so as to operate on the descending slope of its characteristic curve so that the spring exerts increasing force as the spring flexes away from its flat position. The increasing wear of the clutch linings will cause the disc spring to flex from its flat position and thus an increased force will be applied to the clutching member to maintain the clutch disc and clutch casing in frictional engagement. As a result, the product of the coefficient of friction of the clutch linings and the spring force urging the clutching members into engagement will remain constant.

Structure is provided in order to adjust the disc spring to the required tension.

Modifications of this invention include providing a second spring which applies a force counter to that of the disc spring and which counter force increases as the wear of the clutch linings increases. These second springs may have several different forms some of which will be described.

As will be clearly apparent from the subsequent detailed description of the clutch of this invention, this friction clutch is advantageous since it provides structure for maintaining the transmitted torque independent of the coefficient of friction of the clutch linings. Any fluctuations in this coefficient of friction occurring during the operation of the clutch as well as in those forces of friction resulting from the wear of the clutch linings can be accurately compensated. The compensating springs have relatively smaller dimensions so as to require a minimum of space. As a result, the entire clutch is small and can be readily employed in the casing of a standard clutch or transmission for motor vehicles.

The costs of fabricating this clutch are low and it can be easily removed for replacing single components thereof. Even though the wear of the clutch linings increases with use, the product of the coefficient of friction between the clutch linings and the spring force, urging the clutch members into engagement remains constant and will be independent of any variations in the coefficient of friction of the clutch linings. Thus, the clutch of this invention can be reliably operated for a long period of time without any necessity for repairs or maintenance.

Other objects and advantages of this invention will be apparent upon reference to the accompanying description when taken in conjunction with the following drawings, wherein FIGURE 1 is a longitudinal sectional view of the friction clutch of this invention;

FIGURE 2 is a front elevational view of the clutch illustrated in FIGURE 1;

FIGURE 3 is a perspective view of a portion of this clutch and showing a recess with sloping walls on the actuating member and a ball positioned in this recess;

FIGURE 4 is a longitudinal sectional view of a friction clutch of another embodiment this invention;

FIGURE 5 is a sectional view taken along the line A–B of FIGURE 4; and

Returning now to the drawings, wherein like reference symbols indicate the same parts throughout the various views, a specific embodiment of this invention will be described with particular reference to FIGURES 1 through 3.

Figure 1:
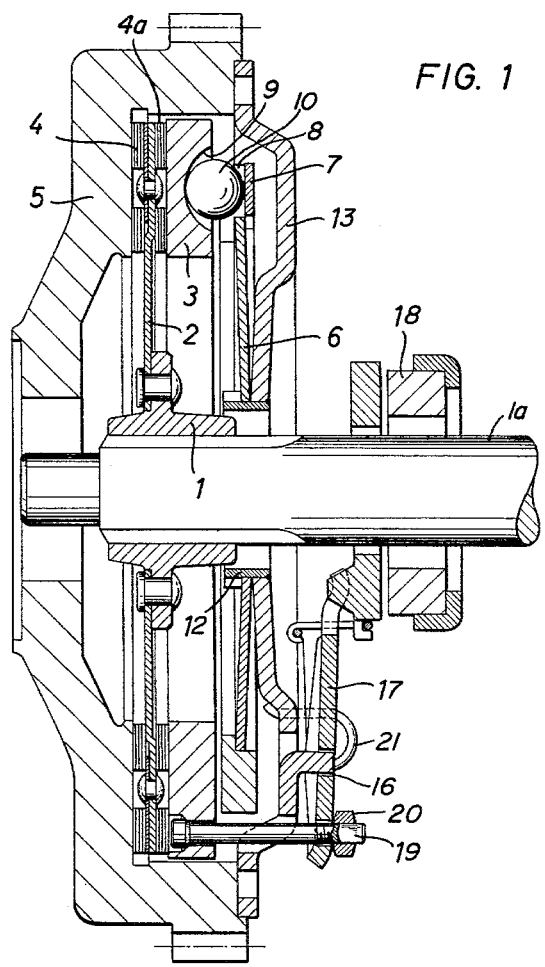

As seen in FIGURE 1, a coupling collar 1 is splined to a driving shaft 1a and a clutch disc 2 is mounted on the coupling collar 1. The outer portion of the clutch disc 2 is positioned between an axially displaceable clutching member 3 and a portion of a clutch casing 5 upon which is mounted a clutch lining 4. A separate clutch lining 4a is mounted on a face of the clutching member 3.

A pre-stressed conical disc spring 6 has its upper end engaging an actuating ring 7. Pairs of cooperating recesses 8 and 9 are formed in the adjacent faces of the actuating member 7 and the clutch member 3. These recesses have sloping walls, as can be seen in FIGURES 1 and 3, and balls 10 are placed in these pairs of recesses so as to provide a driving connection between the actuating member and the clutching member, but also providing limited rotative movement between these two members.

The inner edge of the disc spring 6 is provided with serrations or splines 11 as may be seen in FIGURES 2 and 3. These splines are mounted with cooperating splines on a coupling cylinder 12 which is positioned concentrically with respect to the shaft 1a. The coupling cylinder 12 is rigidly secured to a plate 13 which covers the open face of the clutch casing 5.

The disc spring 6 has a plurality of radially extending projections 14 which slidably engage with corresponding grooves 15 provided on the inner edge of the actuating ring 7.

The coupling cylinder 12 is fixedly mounted on the clutch casing 5 and is non-rotatable with respect thereto. The plate 13 has a plurality of axially extending tabs 16 upon which are pivotally mounted levers 17. The inner ends of the levers 17 are engageable by an axially displaceable actuating ring 18 which is positioned concentrically with respect to the shaft 1a. The outer ends of the levers 17 are connected to bolts 19 whose inner ends are connected to the clutching member 3. Nuts 20 are threaded on the outer ends of the bolts 19 to maintain the connection between the bolts 19 and the lever 17. Torsion springs 21 are provided to bias the lever 17 in such a manner that the outer end thereof bears against the adjusting nut 20.

The disc spring 6 is prestressed when it is mounted in the clutch between the actuating ring 7 and the axially displaceable cover plate 13. As can be seen in FIGURE 1, the disc spring has a flat conical shape with the concave portion being directed to the clutching surfaces of the clutch. The deflection-force characteristic curve of this spring is such that the curve first rises to a maximum and then descends. The spring 6 is so prestressed that the range of action of the spring is beyond this apex or in the descending portion of the characteristic curve.

In the operation of the embodiment of the clutch as described above and illustrated in FIGURES 1 through 3, when the friction value between the clutching surfaces increases and the transmitted torque remains constant, the clutching member 3 and the actuating ring 7 will be urged apart by the wedging action of the balls 10 retained therebetween. This movement of the actuating ring 7 to the right, as viewed in FIGURE 1, will further stress the disc spring 6. However, since this spring 6 is operating on the downwardly sloping portion of its characteristic curve, the increase in the stress of the spring will result in a decrease in the force exerted by the spring against the actuating ring 7. Therefore, the increased frictional forces, together with the decreased spring loading of the clutching surfaces due to the particular characteristics of the disc spring 6, will remain substantially constant.

On the other hand, as the clutch linings 4 and 4a wear, it will be apparent that the frictional forces between these clutch surfaces will gradually decrease. This decrease in frictional force, however, will be compensated for by the movement to the left of the outer end of the disc spring 6, as viewed in FIGURE 1. This movement of the disc spring will result in increased force being exerted by the spring against the actuating ring 7 and, accordingly, the clutching member 3. As a result, the spring loading between the clutching surfaces will be increased. Thus, as the clutch linings 4 and 4a wear and the coefficient of friction thereof becomes less, the product of the coefficient of friction between the clutch surfaces and the spring force with which the clutch surfaces are pressed into engagement will remain constant.

In addition, it should be pointed out that the progressive fatigue of the disc spring 6 will be compensated for by the natural wear of the clutch linings 4 and 4a.

In order to disengage the friction clutch, the sliding ring 18 is moved to the left as shown in FIGURE 1. Accordingly, the levers 17 will be pivoted about their pivot points 16 to withdraw the clutching member 3 from engagement with the clutch disc 2 through the connection of the bolt 19. The clutch is engaged by moving the sliding ring 18 to the right and the reverse procedure occurs. This will bring the clutch linings 4 and 4a into frictional engagement.

Proceeding next to FIGURES 4 and 5, there is illustrated a modification of the friction clutch of this invention. In this modification the clutching member 3' performs the same function as described in connection with FIGURES 1 through 3, but is shaped somewhat differently since, in this embodiment, there is no ball connection between the clutching member and an actuating ring. In this modification the outer end of the disc spring 6 is in engagement with the clutching member 3' and the inner edge of the disc spring 6 is mounted on a coupling collar 22 which is concentric with the shaft 1a. A second coupling collar 23 is positioned adjacent the coupling collar 22 and there are cooperating recesses 24 and 25 in the adjacent faces of these coupling collars. These recesses have sloping walls as described in connection with the embodiment of this invention and balls 26 are positioned in the pairs of recesses.

The coupling collar 23 is connected to the clutch casing 5 through a cover plate 27 to which it is bolted and which is non-rotatably mounted with respect to the clutch casing 5 and is axially displaceable with respect thereto.

An additional disc spring 28 is mounted with its inner edge on a supporting ring 29 positioned outwardly of the coupling collar 23.

The outer edges of the disc spring 28 act against adjusting nuts 30 which are positioned on the ends of bolts 30a whose inner ends are embedded in the clutching member 3'. The tension in the disc spring 28 can be adjusted by the adjusting nuts 30. The disc spring 28 is mounted in such a manner that it is not prestressed when new clutch linings 4 and 4a are employed in the clutch.

The relationship between the sloping surfaces of the recesses 24 and 25 and the disc spring 6 is so selected that a relative rotative movement between the coupling collars 22 and 23 will produce a variation in the force exerted by the disc spring 6 to compensate for the variations in the coefficients of friction between the clutching surfaces of the clutch. As a result, the product of the spring forces and the friction value will remain constant when the force exerted by the disc spring 6 varies because of variations in the coefficient of friction of the clutch linings.

In the operation of the modification of FIGURE 4, a second disc spring 28 supplies a force counter to the disc spring 6 so as to maintain a constant surface pressure between the clutching surfaces. No force is exerted by the disc spring 28 when new clutch linings are mounted on the clutch surfaces. However, as the clutch linings wear, and the disc spring 6 flexes towards the left, as seen in FIGURE 4, in order to compensate for the worn linings, the disc spring 28 will supply an increasing force counter to the force of disc spring 6. As a result, the surface pressure between the clutching surfaces will not vary because of the wear in the clutch linings.

Figure 6:
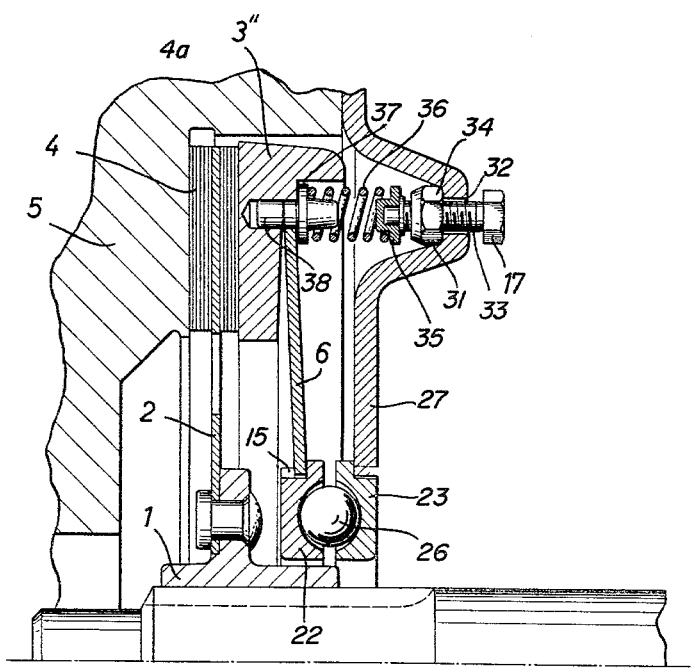
FIGURE 6 is a longitudinal sectional view of a half of a further modification of the clutch of the present invention.

In the modification of FIGURE 6 the second disc spring 28 is replaced by a plurality of coil springs. In this modification the pressure plate 27 is provided with a plurality of cup-like recesses 31. In the bases of these recesses there are provided bores 32 in which are inserted bolts 33 whose inner ends are threaded through nuts 34. On the extreme ends of the bolts 33 there are provided collars 35 which bear against one end of helical springs 36. The other ends of the helical springs bear against collars 37 formed on pins 38 which are secured in the clutching member 3". Thus the force exerted by the springs 36 can be adjusted by manipulation of the bolt 33.

The springs 36 exert their force in the same direction as the disc spring 6. Thus, these springs 36 are pre-stressed when new clutch linings 4 and 4a are placed upon the clutch surfaces. As the clutch linings wear, the clutching member 3" will move towards the left, as seen in FIGURE 6, under the influence of the disc spring 6. This will cause the springs 36 to become extended and accordingly apply less force against the clutching member 3". As a result, the increase in surface pressure between the clutching surfaces that is caused by the wearing of the clutch linings is compensated for by the disc spring 6 and the helical springs 36.

Thus it can be seen that the present invention has provided a friction clutch of a simple construction wherein fluctuations in the torque delivered by this clutch due to wear of the clutch linings or variations in the coefficient of friction are compensated for by effective spring arrangements. These spring arrangements require a minimum of space and are highly accurate so that precise adjustments of the clutch can be obtained. Since the volume occupied by the improved friction clutch of this invention is not increased, the clutch can be used in conventional applications for friction clutches.

It will be understood that this invention is susceptible to modification in order to adapt it to different usages and conditions and, accordingly, it is desired to comprehend such modifications within this invention as may fall within the scope of the appended claims.

What is claimed as this invention is:

1. A friction clutch comprising first and second rotatable clutch members for frictional engagement with each other, a clutching member engageable with one of said clutch members to urge said clutch members into frictional engagement, an actuating member adjacent said clutching member, said clutching and actuating members having pairs of cooperating recesses, sloping walls, balls positioned in said pairs of recesses to drivingly connect said clutching and actuating members while permitting limited relative rotation therebetween, an axially displaceable disc spring clamped between said actuating member and a portion of one of said clutch members and rotatable therewith to urge said actuating member towards said clutch members, said spring force-deflection characteristics and the slopes of said recess walls being such that the product of the coefficient of friction of the clutch members and the spring force will remain constant regardless of variations in the coefficient of friction of said clutch members, and means for adjusting the tension on said disc spring, said means comprising adjustable spring means acting on the outer edge of said disc spring.

2. A friction clutch comprising a clutch disc, a clutch casing, cooperating clutch linings on said clutch disc and clutch casing for frictional engagement therebetween, an annular clutching member with one face being engageable with said clutch disc and the other face having a plurality of recesses therein with sloping walls, an actuating ring adjacent said other face of said clutching member and having a corresponding plurality of recesses with sloping walls cooperating with said clutching member recesses, balls positioned in said cooperating pairs of recesses, said actuating ring having a plurality of grooves therein, a splined coupling cylinder fixedly attached to said clutch casing, a disc spring nonrotatably mounted on said splined coupling cylinder and operating to urge said actuating ring against said clutching member, there being projections on the periphery of said disc spring and slidably received in said actuating ring grooves, said spring force-deflection characteristics and the slopes of said recess walls being such that the product of the coefficient of friction of the clutch members and the spring force will remain constant regardless of variations in the coefficient of friction of said clutch members.

3. A friction clutch comprising a clutch disc, a clutch casing, cooperating clutch linings on said clutch disc and clutch casing for frictional engagement therebetween, an annular clutching member with one face being engageable with said clutch disc and the other face having a plurality of recesses therein with sloping walls, an actuating ring adjacent said other face of said clutching member and having a corresponding plurality of recesses with sloping walls cooperating with said clutching member recesses, balls positioned in said cooperating pairs of recesses, and a disc spring urging said actuating ring against said clutching member, said spring force-deflection characteristics and the slopes of said recess walls being such that the product of the coefficient of friction and the spring force will remain constant regardless of variations in the coefficient of friction of said clutch members, pre-stressed spring means urging said clutching member against said clutch disc and casing, said spring means exerting maximum force when new clutch linings are mounted on said clutch disc and casing with said force decreasing as the linings wear.

4. A friction clutch comprising a clutch disc, a clutch casing, cooperating clutch linings on said clutch disc and clutch casing for frictional engagement therebetween, an axially displaceable annular clutching member engageable with said clutch disc, a pair of cooperating collars with one of said collars being mounted on said clutch casing, there being pairs of cooperating recesses with sloping walls on adjacent faces of said collars, balls in said pairs of recesses, a disc spring mounted on the other of said collars and urging said clutching member against said clutch disc, said spring force-deflection characteristics and the slopes of said recess walls being such that the product of the coefficient of friction and the spring force will remain constant regardless of variations in the coefficient of friction of said clutch members, a supporting ring mounted on said clutch casing outwardly of said one collar, a second disc spring mounted on said supporting ring and exerting a force on said clutching member counter to said first disc spring, and means on said clutch casing for adjusting the tension of said second disc spring.

5. A friction clutch comprising a clutch disc, a clutch casing, a cover plate mounted on said clutch casing and closing one side thereof, cooperating clutch linings on said clutch disc and clutch casing for frictional engagement therebetween, an axially displaceable annular clutching member engageable with said clutch disc, a pair of cooperating collars with one collar being mounted on said cover plate, there being pairs of cooperating recesses with sloping walls on the adjacent faces of said collars, balls in said pairs of recesses, a disc spring mounted on the other of said collars and urging said clutching member against said clutch disc, said spring force-deflection characteristics and the slopes of said recess walls being such that the product of the coefficient of friction and the spring force will remain constant regardless of variations in the coefficient of friction of said clutch members, pre-stressed spring means between said cover plate and said clutching member urging said clutching member against said clutch disc, said spring means exerting maximum force when new clutch linings are mounted on said clutch disc and casing with said force decreasing as the linings wear, and means on said cover plate for adjusting the tension of said spring means.

References Cited by the Examiner

UNITED STATES PATENTS

| | | | |
|---|---|---|---|
| 2,124,097 | 7/38 | Wolfram | 192—32 |
| 2,219,139 | 10/40 | Nutt et al. | |
| 2,221,399 | 11/40 | Geyer | 192—32 |
| 2,748,913 | 6/56 | Binder et al | 192—68 |
| 2,856,048 | 10/58 | Carlson | 192—89 X |

FOREIGN PATENTS 70,539   12/58   France.
(1st addition to 1,116,646)

DAVID L. WILLIAMOWSKY, *Primary Examiner.*